US007882493B2

(12) United States Patent
Uehara et al.

(10) Patent No.: US 7,882,493 B2
(45) Date of Patent: Feb. 1, 2011

(54) SOFTWARE TEST MANAGEMENT PROGRAM SOFTWARE TEST MANAGEMENT APPARATUS AND SOFTWARE TEST MANAGEMENT METHOD

(75) Inventors: Tadahiro Uehara, Kawasaki (JP); Kyoko Ohashi, Kawasaki (JP); Asako Katayama, Kawaski (JP); Rieko Yamamoto, Kawasaki (JP); Toshihiro Kodaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1298 days.

(21) Appl. No.: 11/353,026

(22) Filed: Feb. 14, 2006

(65) Prior Publication Data
US 2007/0174711 A1 Jul. 26, 2007

(30) Foreign Application Priority Data
Nov. 14, 2005 (JP) ............................. 2005-328281

(51) Int. Cl.
*G06F 9/44* (2006.01)
(52) U.S. Cl. ...................................... 717/124
(58) Field of Classification Search ......... 717/124–135; 714/38
See application file for complete search history.

(56) References Cited

U.S. PATENT DOCUMENTS

| 6,502,235 B1* | 12/2002 | Tosaka et al. ............... 717/126 |
| 6,698,012 B1* | 2/2004 | Kossatchev et al. ......... 717/126 |
| 6,725,399 B1* | 4/2004 | Bowman ..................... 714/38 |
| 7,299,382 B2* | 11/2007 | Jorapur ....................... 714/38 |
| 7,490,319 B2* | 2/2009 | Blackwell et al. .......... 717/124 |
| 7,596,778 B2* | 9/2009 | Kolawa et al. ............. 717/126 |
| 2002/0198868 A1* | 12/2002 | Kinzhalin et al. .............. 707/3 |
| 2003/0003432 A1* | 1/2003 | Kinzhalin et al. ........... 434/322 |
| 2003/0018932 A1* | 1/2003 | Blum et al. ................... 714/46 |
| 2003/0093716 A1* | 5/2003 | Farchi et al. ................. 714/34 |
| 2003/0097650 A1* | 5/2003 | Bahrs et al. ................. 717/124 |

(Continued)

FOREIGN PATENT DOCUMENTS

JP 07-210424 8/1995

(Continued)

OTHER PUBLICATIONS

Hyades Project Archives, "Eclipse Test and Performance Tools Platform" (http://www.eclipse.org/tptp/home/archieves/index.html).

*Primary Examiner*—Anna Deng
(74) *Attorney, Agent, or Firm*—Fujitsu Patent Center

(57) ABSTRACT

A software test management program, a software test management apparatus and a software test management method can integrally manage test-related information that are to be effectively exploited among test support functions. The software test management apparatus includes a design model registration section 31 that registers a design model, a source code registration section 34 that registers a source code, a test model registration section 32 that registers the test model prepared to correspond to the design model and also the corresponding relationship between the design model and the test model, an execution trace registration section 33 that registers the execution trace of each test case obtained by executing the source code according to the test cases in the test model, the corresponding relationship between the test model and the execution trace and also the corresponding relationship between the execution trace and the source code and a model relations management interface 12 that traces all the corresponding relationships.

15 Claims, 20 Drawing Sheets

U.S. PATENT DOCUMENTS

| | | | |
|---|---|---|---|
| 2003/0212661 A1* | 11/2003 | Avvari et al. | 707/2 |
| 2004/0073890 A1* | 4/2004 | Johnson et al. | 717/124 |
| 2005/0193269 A1* | 9/2005 | Haswell et al. | 714/38 |
| 2005/0223357 A1* | 10/2005 | Banerjee et al. | 717/120 |
| 2005/0223361 A1* | 10/2005 | Belbute | 717/124 |
| 2005/0229159 A1* | 10/2005 | Haba et al. | 717/122 |
| 2006/0041864 A1* | 2/2006 | Holloway et al. | 717/124 |
| 2006/0059253 A1* | 3/2006 | Goodman et al. | 709/223 |
| 2006/0248405 A1* | 11/2006 | Ponczak et al. | 714/38 |
| 2007/0271483 A1* | 11/2007 | Kolawa et al. | 714/38 |
| 2008/0263506 A1* | 10/2008 | Broadfoot et al. | 717/104 |

FOREIGN PATENT DOCUMENTS

| | | |
|---|---|---|
| JP | 08-044590 | 2/1996 |
| JP | 09-223040 | 8/1997 |
| JP | 10-254930 | 9/1998 |
| JP | 11-015693 | 1/1999 |
| JP | 2002-014847 | 1/2002 |

* cited by examiner

FIG. 3

TEST CASE

| TEST CASE ID | SUMMARY | ORIGIN OF TRANSITION IMAGE | DESTINATION OF TRANSITION IMAGE | BUTTON | INPUT DATA | OUTPUT DATA |
|---|---|---|---|---|---|---|
| TC-001-1 | NORMAL PURCHASE, NOT MEMBER | INPUT IMAGE | CONFIRMATION IMAGE | CALCULATION | CLIENT ID=01,COMMODITY ID=101, QUANTITY=1 | AMOUNT = 100 |
| | | CONFIRMATION IMAGE | INPUT IMAGE | PURCHASE | — | — |
| TC-001-2 | NORMAL PURCHASE, MEMBER | INPUT IMAGE | CONFIRMATION IMAGE | CALCULATION | CLIENT ID=10,COMMODITY ID=101, QUANTITY=1 | AMOUNT = 98 |
| | | CONFIRMATION IMAGE | INPUT IMAGE | PURCHASE | — | — |
| TC-001-3 | CLIENT ID ERROR | INPUT IMAGE | ERROR IMAGE | CALCULATION | CLIENT ID=SS,COMMODITY ID=101, QUANTITY=1 | MESSAGE = INCORRECT CLIENT ID |
| | | ERROR IMAGE | INPUT IMAGE | RETURN | — | — |
| TC-001-4 | COMMODITY ID ERROR | INPUT IMAGE | ERROR IMAGE | CALCULATION | CLIENT ID=01,COMMODITY ID=999, QUANTITY=1 | MESSAGE = INCORRECT CLIENT ID |
| | | ERROR IMAGE | INPUT IMAGE | RETURN | — | — |

CORRESPONDING RELATIONSHIP INFORMATION

```
<testmodel>
  <testcase id="tst1" name="TC-001-1" trace_ref="trc1"/>
  <testcase id="tst2" name="TC-001-2" trace_ref="trc2"/>
  <testcase id="tst3" name="TC-001-3" trace_ref="trc3"/>
  <testcase id="tst4" name="TC-001-4" trace_ref="trc4"/>
</testmodel>
```

FIG. 4

EXECUTION TRACE

```
ResisterServlet#doPost(HttpServletRequest,HttpServletResponse)
  RegisterOrder#calcTotalAmount(String,String,int)
    RegisterOrder#checkInput(String,String,int)
    RegisterOrder#calcTotal(String,int)
    RegisterOrder#isMember(String)
ResisterServlet#doPost(HttpServletRequest,HttpServletResponse)
  RegisterOrder#registerOrder(String,String,int,int)
    OrderDB#insert(String,String,int,int)
```

```
ResisterServlet#doPost(HttpServletRequest,HttpServletResponse)
  RegisterOrder#calcTotalAmount(String,String,int)
    RegisterOrder#checkInput(String,String,int)
    RegisterOrder#calcTotal(String,int)
    RegisterOrder#isMember(String)
    RegisterOrder#discount(int)
ResisterServlet#doPost(HttpServletRequest,HttpServletResponse)
  RegisterOrder#registerOrder(String,String,int,int)
    OrderDB#insert(String,String,int,int)
```

```
ResisterServlet#doPost(HttpServletRequest,HttpServletResponse)
  RegisterOrder#calcTotalAmount(String,String,int)
    RegisterOrder#checkInput(String,String,int)
ResisterServlet#doPost(HttpServletRequest,HttpServletResponse)
```

```
ResisterServlet#doPost(HttpServletRequest,HttpServletResponse)
  RegisterOrder#calcTotalAmount(String,String,int)
    RegisterOrder#checkInput(String,String,int)
ResisterServlet#doPost(HttpServletRequest,HttpServletResponse)
```

CORRESPONDING RELATIONSHIP INFORMATION

```xml
<tracemodel>
  <trace id="trc1">
    <invocation exp="RegisterServlet#doPost" source_ref="src1">
      <sentence num="7"/>
      <sentence num="8">
        <invocation exp="RegisterOrder#calcTotalAmount" source_ref="src2">
          <sentence num="3">
            <invocation exp="RegisterOrder#checkInput" source_ref="src3">
              ...
            </invocation>
          </sentence>
          <sentence num="4"/>
        </invocation>
      </sentence>
      </sentence num="9"/>
    </invocation>
    ..
  </trace>
  ..
</tracemodel>
```

FIG. 5

SOURCE CODE

```
Public class RegisterOrder{
  public int calcTotalAmount(String customerID, String productID, int quantity){
    int rtnCode = checkInput(customerID,productID,quantity);
    if (rtnCode != OK){
      return rtnCode;
    }
    int amount = calcTotal(productID,auantity);
    if (isMember(customerID){
      amount = discount(amount);
    }
    return amount;
  } private int discount(amount){
    return (int)amount-amount*0.02;
  } private int checkInput(String customerID, String productID, int quantity){
    ...
```

CORRESPONDING RELATIONSHIP INFORMATION

```
<sourcemodel>
  <source name="RegisterServlet.java">
    <class name="RegisterServlet">
      <method id="src1" expression="doPost"/>
      ...
    </class>
  </source>
  <source name="RegisterOrder.java">
    <class name="RegisterOrder">
      <method id="src2" expression="calcTotalAmount"/>
      <method id="src3" expression="checkInput"/>
      ...
    </class>
  </source>
  ...
</sourcemodel>
```

FIG. 6

```
class Usecase{
  String getID();
  String setID(String id);
  String getName();
  String setName(String name);
  String getDescription();
  String setDescrption(String desc);
  List getSequences();
  void setSequences(List seqs);
  ...
  List getTestCases();
  void setTestCase(List cases);
}

Class Sequence{
  ...
  TestCase getTestCase();
  void setTestCase(TestCase case);
}
```

```
class Trace{
  List getTopInvocations();
  void setTopinvocations(List invs);
  ...
  TestCase getTestCase();
  void setTestCase(TestCase case);
} class Invocation{
  String getInvokedMethodExpression();
  void setInvokedMethodExpression(String exp);
  List getSentences();
  void setSentences(List sents);
  ...
  Method getMethod();
  void setMethod(Method);
}
class Sentence{
  String getSentenceExpression();
  void setSentenceExpression(String exp);
  int getSourceLineNumber();
  void setSourceLineNumber(int num);
  Invocation getInvocation();
  void setInvocation(Invocation inv);
  ...
}
```

```
class TestCase{
  String getID();
  String setID(String id);
  String getName();
  String setName(String name);
  List getChildTestCases();
  List setChildTestCase(List cases);
  List getInputData();
  void setInputData(List data);
  List getOutputData();
  void setOutputData(List data);
  List getResults();
  void addResult(Result result);
  ...
  Usecase getUsecase();
  void setUsecase(Usecase case);
  List getTrace();
  addTrace(Trace trace);
}
```

```
class Source{
  String getName();
  void setName(String name);
  Lists getClasses();
  void setClasses(List classes);
  ...
} class Class{
  String getName();
  void setName(String name);
  List getMethods();
  void setMethods(List methods);
  int getLineNumber();
  void setLineNumber(int num);
  ...
}

Class Method{
  String getSignature();
  void setSignature(String sig);
  String getBody();
  void setBody(String body);
  int getLineNumber();
  void setLineNumber(int num);
  ...
  Invocation getInvocation();
  void setInvocation(Invocation inv);
}
```

FIG. 7

```
//USE CASE: ACQUIRE METHOD NAME CALLED FIRST IN UC-001.
Usecase uc = ModelManager.getUsecase("UC-001");
TestCase tc = (TestCase)uc.getTestCases().get(0);
Trace tr = tc.getTrace();
Invocation inv = (Invocation)tr.getTopInvocations().get(0);
Method mt = inv.getMethod();
String firstMethod = mt.getSignature();
```

FIG.11

SOURCE CODE

```
Public class RegisterOrder{
  pubilc int calcTotalAmount(String customerID, String productID, int quantity){
    int rtnCode = checkInput(customerID,productID,quantity);
    if (rtnCode != OK){
      return rtnCode;
    }
    int amount = calcTotal(productID,auantity);
    if (isMember(customerID){
      amount = discount(amount);
    }
    return amount;
  } private int discount(amount){
    return (int)amount-amount*0.05;   ◄─────────
  } private int checkInput(String customerID, String productID, int quantity){
    ...
```

FIG.12

EXECUTION TRACE

```
ResisterServlet#doPost(HttpServletRequest,HttpServletResponse)
  RegisterOrder#calcTotalAmount(String,String,int)
    RegisterOrder#checkInput(String,String,int)
    RegisterOrder#calcTotal(String,int)
    RegisterOrder#isMember(String)
ResisterServlet#doPost(HttpServletRequest,HttpServletResponse)
  RegisterOrder#registerOrder(String,String,int,int)
    OrderDB#insert(String,String,int,int)
```

```
ResisterServlet#doPost(HttpServletRequest,HttpServletResponse)
  RegisterOrder#calcTotalAmount(String,String,int)
    RegisterOrder#checkInput(String,String,int)
    RegisterOrder#calcTotal(String,int)
    RegisterOrder#isMember(String)
    RegisterOrder#discount(int)   ←
ResisterServlet#doPost(HttpServletRequest,HttpServletResponse)
  RegisterOrder#registerOrder(String,String,int,int)
    OrderDB#insert(String,String,int,int)
```

```
ResisterServlet#doPost(HttpServletRequest,HttpServletResponse)
  RegisterOrder#calcTotalAmount(String,String,int)
    RegisterOrder#checkInput(String,String,int)
ResisterServlet#doPost(HttpServletRequest,HttpServletResponse)
```

```
ResisterServlet#doPost(HttpServletRequest,HttpServletResponse)
  RegisterOrder#calcTotalAmount(String,String,int)
    RegisterOrder#checkInput(String,String,int)
ResisterServlet#doPost(HttpServletRequest,HttpServletResponse)
```

FIG.13

TEST CASE

| TEST CASE ID | SUMMARY | ORIGIN OF TRANSITION IMAGE | DESTINATION OF TRANSITION IMAGE | BUTTON | INPUT DATA | OUTPUT DATA |
|---|---|---|---|---|---|---|
| TC-001-1 | NORMAL PURCHASE, NOT MEMBER | INPUT IMAGE | CONFIRMATION IMAGE | CALCULATION | CLIENT ID=01,COMMODITY ID=101, QUANTITY=1 | AMOUNT = 100 |
| | | CONFIRMATION IMAGE | INPUT IMAGE | PURCHASE | — | — |
| TC-001-2 | NORMAL PURCHASE, MEMBER | INPUT IMAGE | CONFIRMATION IMAGE | CALCULATION | CLIENT ID=10,COMMODITY ID=101, QUANTITY=1 | AMOUNT = 98 ← |
| | | CONFIRMATION IMAGE | INPUT IMAGE | PURCHASE | — | — |
| TC-001-3 | CLIENT ID ERROR | INPUT IMAGE | ERROR IMAGE | CALCULATION | CLIENT ID=SS,COMMODITY ID=101, QUANTITY=1 | MESSAGE = INCORRECT CLIENT ID |
| | | ERROR IMAGE | INPUT IMAGE | RETURN | — | — |
| TC-001-4 | COMMODITY ID ERROR | INPUT IMAGE | ERROR IMAGE | CALCULATION | CLIENT ID=01,COMMODITY ID=999, QUANTITY=1 | MESSAGE = INCORRECT CLIENT ID |
| | | ERROR IMAGE | INPUT IMAGE | RETURN | — | — |

FIG.14

USE CASE

```
USE CASE: ORDER PLACEMENT FOR A COMMODITY
ID: UC-001
ACTOR: CLIENT
DESCRIPTION:
1: INPUT CLIENT ID.
2: INPUT COMMODITY ID.
3: INPUT QUANTITY.
4: DEPRESS CALCULATION BUTTON.
   ERROR IF CLIENT ID IS NOT FOUND IN CLIENT DB.
   ERROR IF COMMODITY ID IS NOT FOUND IN COMMODITY DB.
5: TOTAL AMOUNT IS DISPLAYED.
   DISCOUNT 5% WHEN CLIENT IS MEMBER.       ←
6. DEPRESS PURCHASE BUTTON.
```

FIG.15

SOURCE CODE

```
Public class RegisterOrder{
  pubilc int calcTotalAmount(String customerID, String productID, int quantity){
    int rtnCode = checkInput(customerID,productID,quantity);
    if (rtnCode == OK){
      int amount = calcTotal(productID,quantity);
      if (isMember(customerID){
        return discount(amount);
      }
      return amount;
    } else {
      return rtnCode;
    }
  } private int discount(amount){
    return (int)amount-amount*0.02;
  } private int checkInput(String customerID, String productID, int quantity){
    ...
```

FIG.16

EXECUTION TRACE

ResisterServlet#doPost(HttpServletRequest,HttpServletResponse)
  RegisterOrder#calcTotalAmount(String,String,int) ←
    RegisterOrder#checkInput(String,String,int)
    RegisterOrder#calcTotal(String,int)
    RegisterOrder#isMember(String)
ResisterServlet#doPost(HttpServletRequest,HttpServletResponse)
  RegisterOrder#registerOrder(String,String,int,int)
    OrderDB#insert(String,String,int,int)

ResisterServlet#doPost(HttpServletRequest,HttpServletResponse)
  RegisterOrder#calcTotalAmount(String,String,int) ←
    RegisterOrder#checkInput(String,String,int)
    RegisterOrder#calcTotal(String,int)
    RegisterOrder#isMember(String)
    RegisterOrder#discount(int)
ResisterServlet#doPost(HttpServletRequest,HttpServletResponse)
  RegisterOrder#registerOrder(String,String,int,int)
    OrderDB#insert(String,String,int,int)

ResisterServlet#doPost(HttpServletRequest,HttpServletResponse)
  RegisterOrder#calcTotalAmount(String,String,int) ←
    RegisterOrder#checkInput(String,String,int)
ResisterServlet#doPost(HttpServletRequest,HttpServletResponse)

ResisterServlet#doPost(HttpServletRequest,HttpServletResponse)
  RegisterOrder#calcTotalAmount(String,String,int) ←
    RegisterOrder#checkInput(String,String,int)
ResisterServlet#doPost(HttpServletRequest,HttpServletResponse)

FIG.18

EXECUTION TRACE trc1

```
ResisterServlet#doPost(HttpServletRequest,HttpServletResponse)
  ...
  RegisterOrder#calcTotalAmount(String,String,int)
    line 3
    RegisterOrder#checkInput(String,String,int)
      line 19
      ...
    line 4
    line 6
    line 7
    RegisterOrder#calcTotal(String,int)
      ...
    line 8
    RegisterOrder#isMember(String)
      ...
    line 10
    line 11
ResisterServlet#doPost(HttpServletRequest,HttpServletResponse)
  ...
``` trc2

```
ResisterServlet#doPost(HttpServletRequest,HttpServletResponse)
  ...
  RegisterOrder#calcTotalAmount(String,String,int)
    line 3
    RegisterOrder#checkInput(String,String,int)
      line 19
      ...
    line 4
    line 5
ResisterServlet#doPost(HttpServletRequest,HttpServletResponse)
  ...
```

FIG.19

SOURCE CODE "iRegisterOrder.java"

```
1: Public class RegisterOrder{
2:   pubilc int calcTotalAmount(String customerID, String productID, int quantity){
3:     int rtnCode = checkInput(customerID,productID,quantity);
4:     if (rtnCode != OK){
5:       return rtnCode;
6:     }
7:     int amount = calcTotal(productID,auantity);
8:     if (isMember(customerID){
9:       amount = discount(amount);
10:    }
11:    return amount;
12: }
13:
14:  private int discount(amount){
15:    return (int)amount-amount*0.02;
16: }
17:
18:  private int checkInput(String customerID, String productID, int quantity){
19:  ···
```

FIG.20

TEST CASE

| TEST CASE ID | SUMMARY | ORIGIN OF TRANSITION IMAGE | DESTINATION OF TRANSITION IMAGE | BUTTON | INPUT DATA | OUTPUT DATA |
|---|---|---|---|---|---|---|
| TC-001-1 | NORMAL PURCHASE, NOT MEMBER | INPUT IMAGE | CONFIRMATION IMAGE | CALCULATION | CLIENT ID=01,COMMODITY ID=101, QUANTITY=1 | AMOUNT = 100 |
| | | CONFIRMATION IMAGE | INPUT IMAGE | PURCHASE | — | — |

FIG.21

TEST CASE TO BE USED AS BASE

| TEST CASE ID | SUMMARY | ORIGIN OF TRANSITION IMAGE | DESTINATION OF TRANSITION IMAGE | BUTTON | INPUT DATA | OUTPUT DATA |
|---|---|---|---|---|---|---|
| TC-001-1 | NORMAL PURCHASE, NOT MEMBER | INPUT IMAGE | CONFIRMATION IMAGE | CALCULATION | CLIENT ID=01,COMMODITY ID=101, QUANTITY=1 | AMOUNT = 100 |
| | | CONFIRMATION IMAGE | INPUT IMAGE | PURCHASE | — | — |

CONDITION: isMember(customerID) == true
BRANCH POINT: IREGISTERORDER.JAVA 8TH LINE

SOFTWARE TEST MANAGEMENT PROGRAM SOFTWARE TEST MANAGEMENT APPARATUS AND SOFTWARE TEST MANAGEMENT METHOD

BACKGROUND OF THE INVENTION

1. Field of the Invention

This invention relates to a software test management program, a software test management apparatus and a software test management method for improving the efficiency of software tests and the quantity of software.

2. Description of the Related Art

To improve the efficiency of the operations (preparation, execution, evaluation, management, etc) in the test process of testing software, it is necessary to effectively utilize the information obtained in preparation works and measurement activities for other operations of the test process of testing the software and in processes (such as design process) other than the test process. For example, techniques for automatically producing test cases from design information and identifying the test cases required to be conducted again by utilizing the outcome of tracing the operation of running a system to be tested are known. Tools for automating a test that are devised on the bases such techniques are also known.

Patent Document 1 (Jpn. Pat. Appln. Laid-Open Publication No. 11-15693) is known as a document describing the prior art relating to the present invention. The test apparatus and the recording medium disclosed in the above cited patent document provide a test operation flow control section that sequentially starts test support functions in an appropriate order and are designed to automate the entire test process by coordinating the pieces of information exchanged among the test support functions.

Thus, it has been possible to coordinate test cases and the formats of test data so that each test support function may utilize the obtained information. However, design information, trace information and source codes are neither held nor coordinated so that it has been difficult to combine test support functions that utilize such information.

For example, while a profiling tool can acquire trace information on running a system to be tested, the user or each test support function is required to independently manage the corresponding relationship between a test case and an operation of tracing the execution of the test case. Thus, it has been difficult for some other test support function to utilize the corresponding relationship.

Additionally, no technique for utilizing design information has been available so far when evaluating the results of the execution of a test case and the test case itself. Therefore, the user is required to analyze the results of the execution of a test and establish correspondence between the design information and the obtained results so as to see if the results of the test are acceptable or not and if the test is executed satisfactorily or not.

SUMMARY OF THE INVENTION

In view of the above-identified problems, it is therefore the object of the present invention to provide a software test management program, a software test management apparatus and a software test management method for integrally managing test-related information so as to be effectively exploited among test support functions.

In an aspect of the present invention, the above object is achieved by providing a software test management program for causing a computer to manage information relating to a software test, the program including: a design model registration step that registers a design model including use cases; a source code registration step that registers a source code prepared on the basis of the design model; a test model registration step that registers the test cases prepared to correspond to the use cases in the design model and test data as test model and also the corresponding relationship between the design model and the test model; an execution trace registration step that registers the execution trace of each test case obtained by executing the source code according to the test cases in the test model, the corresponding relationship between the test model and the execution trace and also the corresponding relationship between the execution trace and the source code; and a model relations management step that traces the corresponding relationship among the design model, the test model, the execution trace and the source code on the basis of the corresponding relationship between the design model and the test model, the corresponding relationship between the test model and the execution trace and the corresponding relationship between the execution trace and the source code.

Preferably, a software test management program according to the invention further includes: an influential test case identifying step that identifies the altered part of the altered source code, detects the execution trace including the altered part, the test case corresponding to the execution trace and the element of the design model corresponding to the test case on the basis of the tracing in the model relationship management step and, if the element of the design model includes an alteration, outputs the test case as amendment-requiring test case after the model relations management step.

Preferably, a software test management program according to the invention further includes: an unextracted test case generation step that detects the unexecuted part of the source code as unexecuted block by comparing the corresponding positions of all the execution trace and the source code on the basis of the tracing in the model relations management step, detects the conditional sentence that determines not to execute the unexecuted block of the source code, detects the execution trace that the conditional sentence is executed and the test case corresponding the execution trace on the basis of the tracing in the model relations management step, determines the condition for the unexecuted block to be executed by the conditional sentence and outputs the test case and the condition as reference information for the test case to be newly prepared after the model relations management step.

Preferably, a software test management program according to the invention further includes: a corresponding source code identifying step that detects the test case corresponding to the element specified in the design model, the execution trace corresponding to the test case and the source code corresponding to the execution trace on the basis of the tracing in the model relations management step and outputs the source code after the model relations management step.

Preferably, a software test management program according to the invention further includes: a corresponding design model identifying step that detects the execution trace that the specified element in the source code is executed, the test case corresponding to the execution trace and the element of the design model corresponding to the test case on the basis of the tracing in the model relations management step and outputs the element of the design model after the model relations management step.

Preferably, in a software test management program according to the invention, the unextracted test case generation step further outputs the element of the design model corresponding to the test case as information for generating a new test case.

In another aspect of the present invention, there is provided a software test management apparatus for managing information relating to a software test, the apparatus including: a design model registration section that registers a design model including use cases; a source code registration section that registers a source code prepared on the basis of the design model; a test model registration section that registers the test cases prepared to correspond to the use cases in the design model and test data as test model and also the corresponding relationship between the design model and the test model; an execution trace registration section that registers the execution trace of each test case obtained by executing the source code according to the test cases in the test model, the corresponding relationship between the test model and the execution trace and also the corresponding relationship between the execution trace and the source code; and a model relations management section that traces the corresponding relationship among the design model, the test model, the execution trace and the source code on the basis of the corresponding relationship between the design model and the test model, the corresponding relationship between the test model and the execution trace and the corresponding relationship between the execution trace and the source code.

Preferably, a software test management apparatus according to the invention further includes: an influential test case identifying section that identifies the altered part of the altered source code, detects the execution trace including the altered part, the test case corresponding to the execution trace and the element of the design model corresponding to the test case on the basis of the tracing by the model relationship management section and, if the element of the design model includes an alteration, outputs the test case as amendment-requiring test case.

Preferably, a software test management apparatus according to the invention further includes: an unextracted test case generation section that detects the unexecuted part of the source code as unexecuted block by comparing the corresponding positions of all the execution trace and the source code on the basis of the tracing by the model relations management section, detects the conditional sentence that determines not to execute the unexecuted block of the source code, detects the execution trace that the conditional sentence is executed and the test case corresponding the execution trace on the basis of the tracing by the model relations management section, determines the condition for the unexecuted block to be executed by the conditional sentence and outputs the test case and the condition as reference information for the test case to be newly prepared.

Preferably, a software test management apparatus according to the invention further includes: an corresponding source code identifying section that detects the test case corresponding to the element specified in the design model, the execution trace corresponding to the test case and the source code corresponding to the execution trace on the basis of the tracing by the model relations management section and outputs the source code.

Preferably, a software test management apparatus according to the invention further includes: a corresponding design model identifying section that detects the execution trace that the specified element in the source code is executed, the test case corresponding to the execution trace and the element of the design model corresponding to the test case on the basis of the tracing by the model relations management section and outputs the element of the design model.

Preferably, in a software test management apparatus according to the invention, the unextracted test case generation section further outputs the element of the design model corresponding to the test case as information for generating a new test case.

In still another aspect of the present invention, there is provided a software test management method for managing information relating to a software test, the method including: a design model registration step that registers a design model including use cases; a source code registration step that registers a source code prepared on the basis of the design model; a test model registration step that registers the test cases prepared to correspond to the use cases in the design model and test data as test model and also the corresponding relationship between the design model and the test model; an execution trace registration step that registers the execution trace of each test case obtained by executing the source code according to the test cases in the test model, the corresponding relationship between the test model and the execution trace and also the corresponding relationship between the execution trace and the source code; and a model relations management step that traces the corresponding relationship among the design model, the test model, the execution trace and the source code on the basis of the corresponding relationship between the design model and the test model, the corresponding relationship between the test model and the execution trace and the corresponding relationship between the execution trace and the source code.

Thus, according to the invention, it is possible to integrally manage information related to the design and test so as to be effectively exploited among test support functions. The efficiency of design and tests can be improved.

BRIEF DESCRIPTION OF THE DRAWINGS

FIG. 3 is a schematic illustration of an example of test model that can be used for the purpose of the present invention, showing the configuration thereof;

FIG. 4 is a schematic illustration of an example of execution trace model that can be used for the purpose of the present invention, showing the configuration thereof;

FIG. 5 is a schematic illustration of an example of source code model that can be used for the purpose of the present invention, showing the configuration thereof;

FIG. 6 is a schematic illustration of an example of source code that can be used for a model access interface for the purpose of the present invention;

FIG. 7 is a schematic illustration of an example of source code that can be used for a test support program using the model access interface of FIG. 6;

FIG. 11 is a schematic illustration of the source code in the source code model in a first specific example of the influential test case identification process according to the present invention;

FIG. 12 is a schematic illustration of the execution trace in the execution trace model in the first specific example of the influential test case identification process according to the present invention;

FIG. 13 is a schematic illustration of the test case in the test model in the first specific example of the influential test case identification process according to the present invention;

FIG. 14 is a schematic illustration of the use case in the design model in the first specific example of the influential test case identification process according to the present invention;

FIG. 15 is a schematic illustration of the source code in the source code model in a second specific example of the influential test case identification process according to the present invention;

FIG. 16 is a schematic illustration of the execution trace in the execution trace model in the second specific example of the influential test case identification process according to the present invention;

FIG. 18 is a schematic illustration of the execution traces in the execution trace model in a specific example of the unextracted test case generation process according to the present invention;

FIG. 19 is a schematic illustration of the source code in the source code model in the specific example of the unextracted test case generation process according to the present invention;

FIG. 20 is a schematic illustration of the test case in the test model in the specific example of the unextracted test case generation process according to the present invention;

FIG. 21 is a schematic illustration of the unextracted test case in the specific example of the unextracted test case generation process according to the present invention;

DETAILED DESCRIPTION OF THE PREFERRED EMBODIMENTS

Now, the present invention will be described in greater detail by referring to the accompanying drawings that illustrate preferred embodiments of the invention.

Firstly, the configuration of a software test management apparatus according to the invention will be described.

Figure 1:
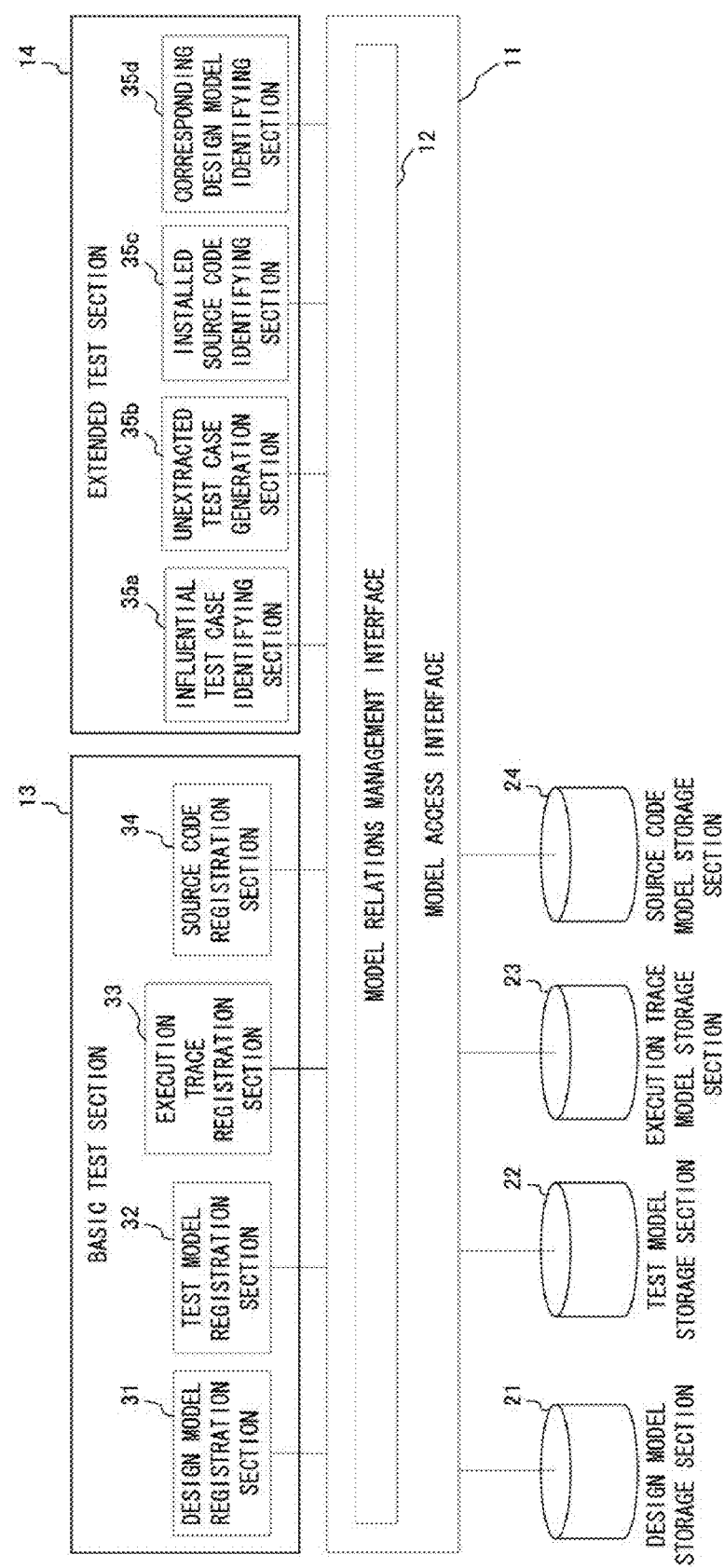
FIG. 1 is a schematic block diagram of an embodiment of software test management apparatus according to the invention, illustrating the configuration thereof.

FIG. 1 is a schematic block diagram of an embodiment of software test management apparatus according to the invention, illustrating the configuration thereof. Referring to FIG. 1, the software test management apparatus includes a model access interface 11, a model relations management interface 12, a basic test section 13, an extended test section 14, a design model storage section 21, a test model storage section 22, an execution trace model storage section 23 and a source code model storage section 24. The basic test section 13 includes a design model registration section 31, a test model registration section 32, an execution trace registration section 33 and a source code registration section 34. The extended test section 14 includes an influential test case identifying section 35a, an unextracted test case generation section 35b, a corresponding source code identifying section 35c and a corresponding design model identifying section 35d.

Now, a design model, a test model, an execution trace model and a source code model will be described below.

A design model is stored in the design model storage section 21 and a test model is stored in the test model storage section 22, while an execution trace model is stored in the execution trace model storage section 23 and a source code model is stored in the source code model storage section 24.

Figure 2:
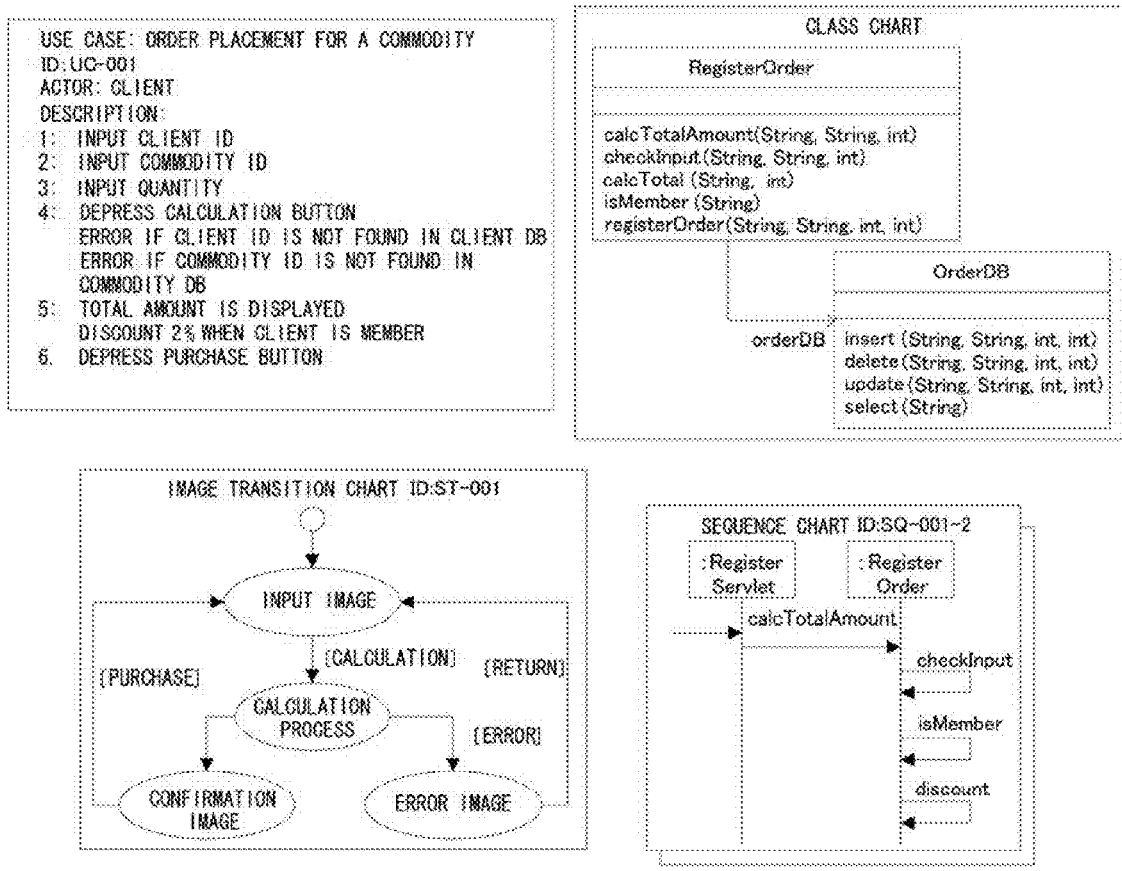
FIG. 2 is a schematic illustration of an example of design model that can be used for the purpose of the present invention, showing the configuration thereof.

FIG. 2 is a schematic illustration of an example of design model that can be used for the purpose of the present invention, showing the configuration thereof. The design model includes use cases, image transition charts for each use case, sequence charts for each use case, class charts and corresponding relationship information indicating the corresponding relationship (link) with other models. In a design model, an image transition chart is provided to correspond to a use case and several sequence charts are provided to correspond to a use case. Sequence charts and class charts are made to correspond to each other by method names.

In this embodiment, XML (eXtensible Markup Language) is used for the description of a model that contains corresponding relationship information. As for the corresponding relationship information of this example, it will be seen from FIG. 2 that the sequence chart names "SQ-001-1", "SQ-001-2", "SQ-001-3" and "SQ-001-4" are arranged so as to correspond respectively to the test case IDs "tst1", "tst2", "tst3" and "tst4" of the test model.

FIG. 3 is a schematic illustration of an example of test model that can be used for the purpose of the present invention, showing the configuration thereof. A test model includes test cases, test data and corresponding relationship information. As for the corresponding relationship information, it will be seen from FIG. 3 that the test case IDs "tst1", "tst2", "tst3" and "tst4" (and the respective test case names of "TC-001-1", "TC-001-2", "TC-001-3" and "TC-001-4") are arranged so as to correspond respectively to the execution trace IDs "trc1", "trc2", "trc3" and "trc4" of the execution trace model.

FIG. 4 is a schematic illustration of an example of execution trace model that can be used for the purpose of the present invention, showing the configuration thereof. The execution trace model includes execution traces and corresponding relationship information. As for the corresponding relationship information, it will be seen from FIG. 4 that the execution trace IDs "trc1", "trc2", "trc3" and "trc4" are arranged so as to correspond respectively to the method IDs "src1", "src2", "src3" and "src4" of the source code model.

FIG. 5 is a schematic illustration of an example of source code model that can be used for the purpose of the present invention, showing the configuration thereof. The source code model includes source codes and corresponding relationship information. As for the corresponding relationship information, it will be seen from FIG. 5 that the method IDs "src1", "src2" and "src3" are arranged so as to correspond respectively to the method names "doPost", "calcTotalAmount" and "checkInput" of the source code model.

While the corresponding relationship information of the design model relative to the test model, the corresponding relationship information of the test model relative to the execution trace model and the corresponding relationship information of the execution trace model relative to the source code model are illustrated and described above, the models include corresponding relationship information as viewed in the other way. More specifically, the models respectively include corresponding relationship information of the source code model relative to the execution trace model, corresponding relationship information of the execution trace model relative to the test model and corresponding relationship information of the test model relative to the design model. While each model includes corresponding relationship information in this embodiment, a file that is separate from the models may alternatively be provided for the corresponding relationship information.

Now, the model access interface 11 will be described below.

The design model registration section 31, the test model registration section 32, the execution trace registration section 33, the source code registration section 34, the influential test case identifying section 35a, the unextracted test case generation section 35b, the corresponding source code identifying section 35c and the corresponding design model identifying section 35d are adapted to access the design model storage section 21, the test model storage section 22, the execution trace model storage section 23 and the source code model storage section 24 by means of the model access interface 11. In this embodiment, the model access interface 11 describes and interprets models in the above described XML format. The model access interface 11 includes the model relations management interface 12. The model relations management interface 12 is used to trace the corresponding relationship information buried in the models and identifies the element of a model that corresponds to an element of another model.

Figure 8:
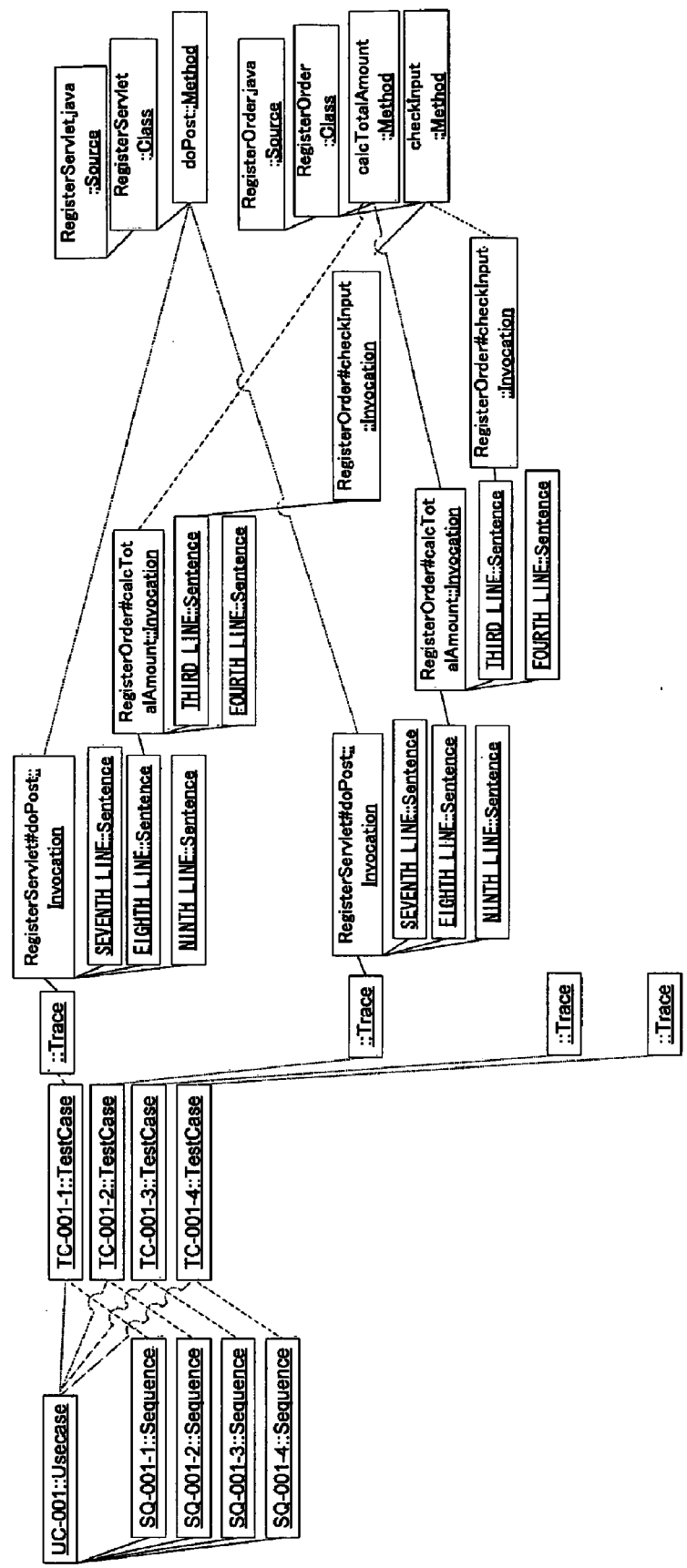
FIG. 8 is a schematic illustration of an example of corresponding relationship that can be obtained by using the model access interface of FIG. 6.

FIG. 6 is a schematic illustration of an example of source code that can be used for a model access interface for the purpose of the present invention. In FIG. 6, the parts that are enclosed by solid lines indicate the model relations management interface 12. FIG. 7 is a schematic illustration of an example of source code that can be used for a test support program using the model access interface of FIG. 6. The test support program is designed to acquire the method name that is called first by the use case "UC-001" by accessing the design model, the test model, the execution trace model and the source code model by means of the model access interface. FIG. 8 is a schematic illustration of an example of corresponding relationship that can be obtained by using the model access interface of FIG. 6. As shown in FIG. 8, the design model, the test model, the execution trace model and the source code model are made to correspond to each other and the corresponding relationships can be used to support tests by means of the model access interface.

Now, the operation of the above-described embodiment of software test management apparatus will be described below.

The software test management apparatus is adapted to execute a basic test process that extends from designing to the first test by means of the basic test section 13 and an extended test process that covers all the subsequent tests by means of the extended test section 14.

Of the processes, the basic test process to be executed by the embodiment of software test management apparatus will be described first in terms of the operation thereof.

Figure 9:
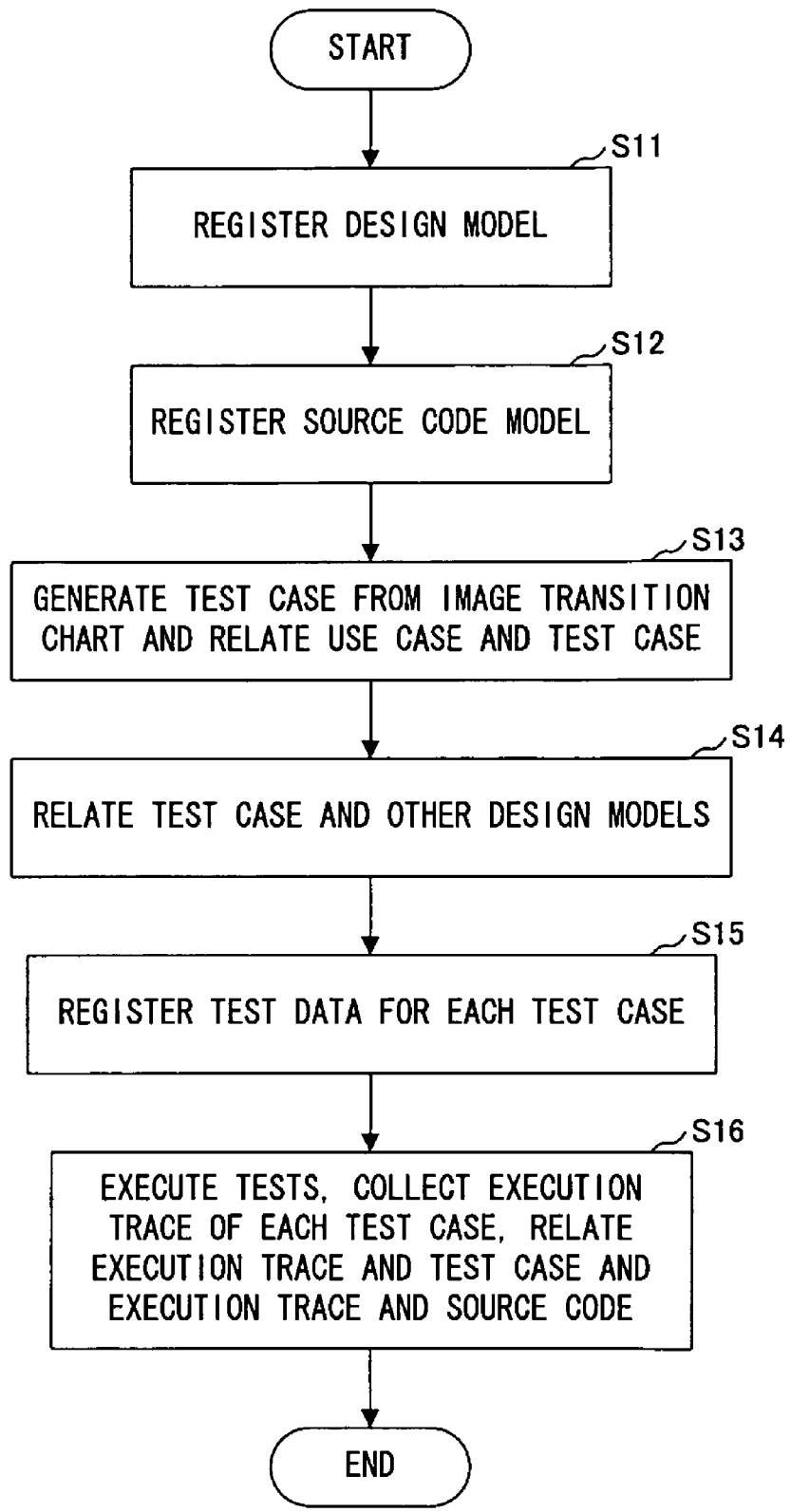
FIG. 9 is a flowchart of an example of operation of the basic test process of an embodiment of software test management apparatus according to the invention.

FIG. 9 is a flowchart of an example of operation of the basic test process to be executed by the embodiment of software test management apparatus according to the invention. Referring to FIG. 9, firstly the design model registration section 31 registers the design model prepared by the user to the design model storage section 21 (S11). Then, the source code registration section 34 analyzes the source code prepared by the user and registers the corresponding relationship information obtained by the analysis of the source code such as the method names and the source code in the source code model storage section 24 as source code model (S12).

Subsequently, the test model registration section 32 registers as test model in the test model storage section 22 the test cases prepared on the basis of the image transition charts registered in the design model storage section 21 and includes corresponding relationship information between the use cases to which the image transition charts belong and the test cases in the design model and the test model (S13). Thereafter, the test model registration section 32 prepares corresponding relationship information on the design model other than the test cases and the use cases and includes it in the design model and the test model (S14). Then, test model registration section 32 includes the test data (input data, output data) for each of the test cases input by the user in the test model (S15).

Subsequently, the execution trace registration section 33 collects the execution traces carried out to follow the test cases in the test model, registers them in the execution trace model storage section 23 as execution trace model and includes the corresponding relationship information between the test cases and the execution traces in the test model and the execution trace model and also the corresponding relationship information between the execution traces and the source code in the execution trace model and the source code model (S16) to end the flow of operation.

The design model registration section 31 may additionally be provided with a functional feature of preparing a design model according to a user input for it. The test model registration section 32 may additionally be provided with a functional feature of preparing test cases and test data either according to a user input for them or automatically on the basis of a design model. The execution trace registration section 33 may additionally be provided with a functional feature of executing a test according to each test case. The source code registration section 34 may additionally be provided with a functional feature of preparing a source code either according to a user input for it or automatically on the basis of the design model.

To date, test environment bases for managing a test model and execution traces that are to be used for test support functions are known. However, there has been no technique for managing the corresponding relationship between a test model and execution traces. According to the present invention, it is now possible to provide a sophisticated test support function for executing an extended test process as will be described hereinafter by managing inter-model corresponding relationship not only between a test model and execution traces but also between a design model and a source code model. Additionally, it is possible to reduce the number of steps for executing a test and so on in order to acquire information necessary for the test support function and improve the efficiency of design and tests by using registered execution traces.

Now, the extended test process to be executed by the embodiment of software test management apparatus will be described below in terms of the operation thereof.

As the extended test process, the influential test case identification process to be executed by the influential test case identifying section 35a, the unextracted test case generation process to be executed by the unextracted test case generation section 35b, the corresponding source code identification process to be executed by the corresponding source code identifying section 35c and the corresponding design model identification process to be executed by the corresponding design model identifying section 35d of this embodiment will be described below.

Of the above listed processes, the influential test case identification process will be described first in terms of the operation thereof.

Figure 10:
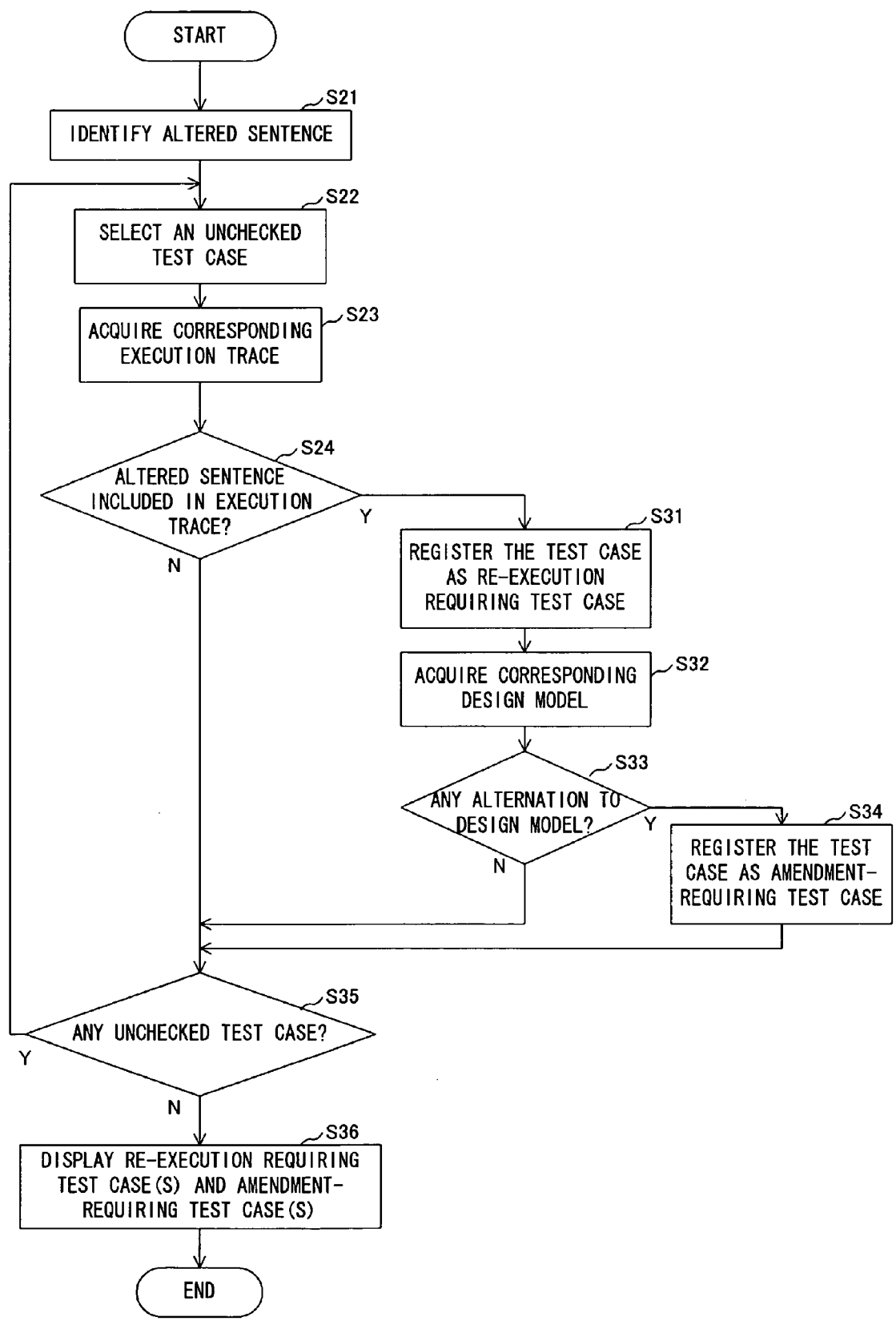
FIG. 10 is a flowchart of an example of operation of the influential test case identification process according to the present invention.

FIG. 10 is a flowchart of an example of operation of the influential test case identification process according to the present invention. The design model storage section 21 and the source code model storage section 24 are managed on the basis of editions and at least the design model and the source code model of the last edition are stored in addition to the design model and the source code model of the newest edition.

Firstly, the influential test case identifying section 35a compares the source code of the newest edition with the source code of the last edition and identifies the altered sentence or sentences (S21). Then, the influential test case identifying section 35a selects a test case that is not checked from the test model (S22), acquires the execution trace corresponding to the test case from the execution trace model (S23) by using corresponding relationship information in the test model and determines if the execution trace contains any altered sentence or not (S24).

If the execution trace does not contain any altered sentence (S24, N), the influential test case identifying section 35a proceeds to processing step S35. If, on the other hand, the execution trace contains one or more than one altered sentences (S24, Y), the influential test case identifying section 35a registers the test case in the test model as re-execution-requiring test case (S31), compares the design model of the newest edition with the design model of the last edition (S32) and determines if the design model is altered or not (S33). If the design model is not altered at all (S33, N), the influential test case identifying section 35a proceeds to processing step S35. If, on the other hand, the design model is altered (S33, Y), the influential test case identifying section 35a registers the test case in the test model as amendment-requiring test case (S34).

Thereafter, the influential test case identifying section 35a determines if there is a test case that is not checked yet in the test model or not (S35). If there is a test case that is not checked yet (S35, Y), the influential test case identifying section 35a proceeds to processing step S22 and selects the next test case. If, on the other hand, all the test cases are checked (S35, N), the influential test case identifying section 35a presents the re-execution-requiring test case and the amendment-requiring test case (S36) and ends the flow of operation.

Now, a first specific example of the influential test case identification process according to the present invention will be described below. FIG. 11 is a schematic illustration of the source code in the source code model in the first specific example of the influential test case identification process. The part indicated by an arrow in FIG. 11 is an altered sentence. FIG. 12 is a schematic illustration of the execution trace in the execution trace model in the first specific example of the influential test case identification process according to the present invention. The part indicated by an arrow in FIG. 12 is the execution trace that corresponds to the above-described altered sentence. FIG. 13 is a schematic illustration of the test case in the test case model in the first specific example of the influential test case identification process according to the present invention. The part indicated by an arrow in FIG. 13 is the test case that corresponds to the above described execution trace. FIG. 14 is a schematic illustration of the use case in the design model in the first specific example of the influential test case identification process according to the present invention. The part indicated by an arrow in FIG. 14 is the altered item of the use case that corresponds to the above-described test case.

Since the use case "UC-001" that corresponds to the test case "TC-001-2" is altered in response to the alteration of the source code, the test case is registered as alteration-requiring test case and presented. More specifically, the output data in this test case needs to be altered to "amount of money=95".

Now, a second specific example of the influential test case identification process according to the present invention will be described below. FIG. 15 is a schematic illustration of the source code in the source code model in the second specific example of the influential test case identification process. The part indicated by an arrow in FIG. 15 is an altered sentence. FIG. 16 is a schematic illustration of the execution trace in the execution trace model in the second specific example of the influential test case identification process according to the present invention. The part indicated by an arrow in FIG. 16 is the execution trace that corresponds to the above-described altered sentence.

Since the use case is not altered in response to the alteration of the source code in the second specific example, the test case that corresponds to the above described execution trace is not an alteration-requiring test case.

To date, techniques for identifying a test case to be re-executed are known. However, there has been no technique for identifying a test case to be amended such as the above described influential test case identification process. Thus, with the influential test case identification process as described above, it is now possible for the user to amend a test case with ease as the process determines if the test case needs to be amended or not by utilizing the design model and presents the design model to the user.

Now, the unextracted test case generation process will be described below in terms of the operation thereof.

Figure 17:
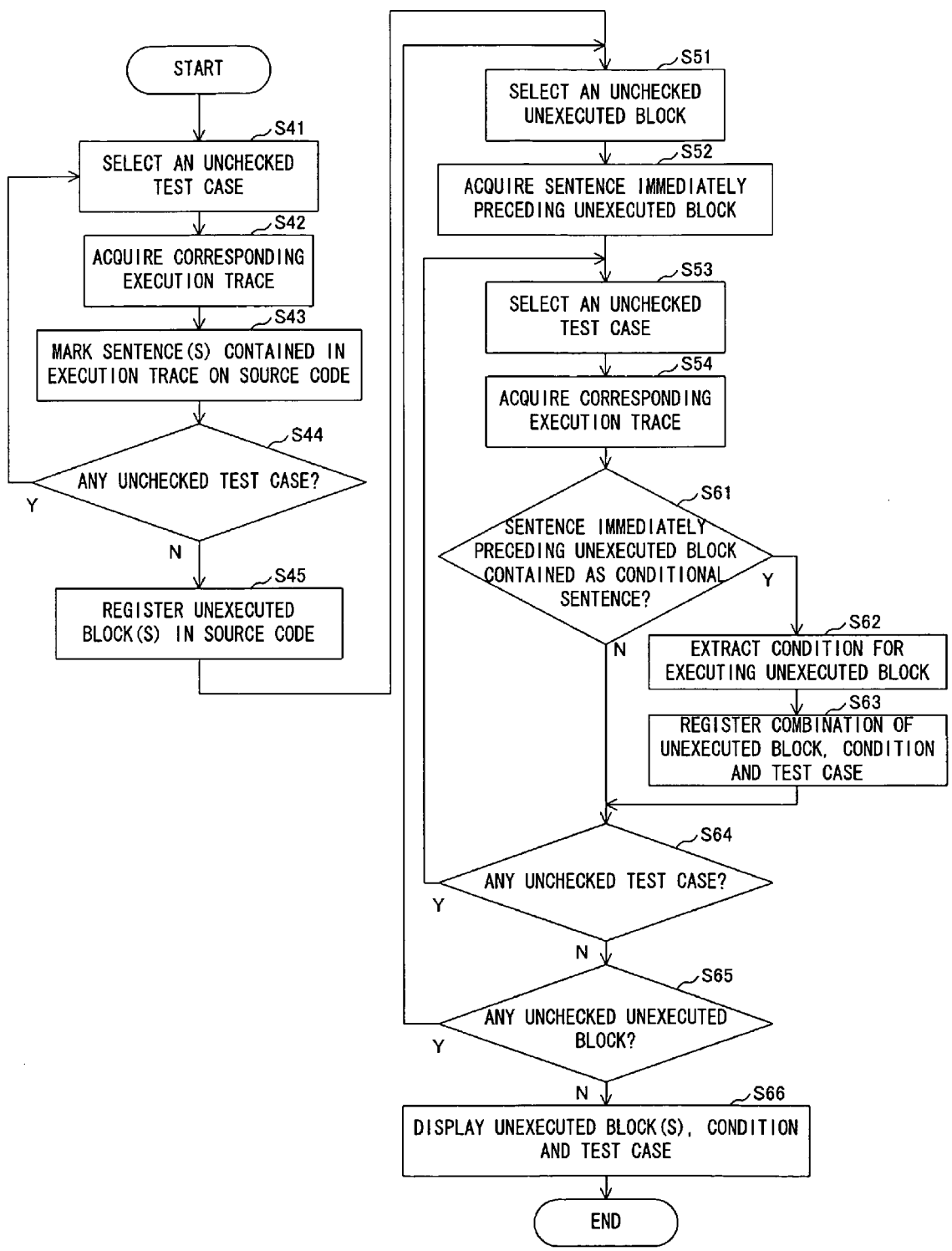
FIG. 17 is a flowchart of an example of operation of the unextracted test case generation process according to the present invention.

FIG. 17 is a flowchart of an example of operation of the unextracted test case generation process according to the present invention. Referring to FIG. 17, firstly the unextracted test case generation section 35b selects one of the test cases that are not checked for marking from the test model (S41) and acquires the execution trace that corresponds to the test case from the execution trace model by means of the corresponding relationship information of the test model (S42). Then, it acquires the source code that corresponds to the execution trace from the source code model by means of the corresponding relationship information of the execution trace model and marks the sentence or sentences contained in the execution trace on the source code (S43).

Then, the unextracted test case generation section 35b determines if there is a test case that is not checked for marking yet in the test model or not (S44). If there is a test case that is not checked yet (S44, Y), the unextracted test case generation section 35b proceeds to processing step S41, where it selects the next test case. If, on the other hand, all the test cases are checked for marking (S44, Y), the unextracted test case generation section 35b detects the sentences that are not marked in the source code and collectively registers the blocks where the detected sentences are found as unexecuted blocks (S45).

Then, the unextracted test case generation section 35b selects one of the unexecuted blocks that are not checked yet (S51) and acquires the marked sentence located immediately before the unexecuted block (the sentence immediately preceding the unexecuted block) (S52). Thereafter, the unextracted test case generation section 35b selects one of the test cases for which the sentence immediately preceding the unexecuted block is not checked from the test model (S53)

and acquires the execution trace that corresponds to the test case from the execution trace model by means of the corresponding relationship information of the test model (S54).

Subsequently, the unextracted test case generation section 35b determines if the execution trace includes the sentence immediately preceding the unexecuted block and the sentence immediately preceding the unexecuted block is a conditional sentence or not (S61). If the answer to either one of the above questions is negative (S61, N), the unextracted test case generation section 35b proceeds to processing step S64. If, on the other hand, the execution trace includes the sentence immediately preceding the unexecuted block and the sentence immediately preceding the unexecuted block is a conditional sentence (S61, Y), the unextracted test case generation section 35b extracts the condition for the unexecuted block to be executed by the conditional sentence (S62) and registers the set of the unexecuted block, the condition and the test case (S63).

Thereafter, the unextracted test case generation section 35b determines if there is a test case that is not checked for the sentence immediately preceding the unexpected block or not (S64). If there is a test case that is not checked yet (S64, Y), the unextracted test case generation section 35b proceeds to processing step S53, where it selects the next test case. If, on the other hand, all the test cases are checked (S64, N), the unextracted test case generation section 35b determines if there is an unexecuted block that is not checked yet (S65). If there is an unexecuted block that is not checked yet (S65, Y), the unextracted test case generation section 35b proceeds to processing step S51, where it selects the next unexecuted block. If, on the other hand, all the unexecuted blocks are checked (S65, N), the unextracted test case generation section 35b displays information for generating an unextracted test case including the test case to be used as base, the condition and the position of the conditional sentence on the basis of the registered unexecuted blocks, the condition and the test cases (S66) to end the flow of operation.

Now, a specific example of the unextracted test case generation process according to the present invention will be described below. FIG. 18 is a schematic illustration of the execution traces in the execution trace model in a specific example of the unextracted test case generation process. Referring to FIG. 18, the execution traces "trc1", "trc2" are execution traces that are recorded on a line by line basis. FIG. 19 is a schematic illustration of the source code in the source code model in the specific example of the unextracted test case generation process according to the present invention. As all the execution traces are marked to the source code, the part enclosed by solid lines (the ninth line) in FIG. 19 is detected as unexecuted block that is an unmarked part and the part immediately preceding it (the eighth line) in FIG. 19 that is indicated by an arrow is detected as the sentence immediately preceding the unexecuted block.

FIG. 20 is a schematic illustration of the test case in the test case model in the specific example of the unextracted test case generation process according to the present invention. Referring to FIG. 20, the test case "TC-001-1" corresponds to the execution trace "trc1" where the sentence immediately preceding the unexecuted block appears. FIG. 21 is a schematic illustration of the unextracted test case in the specific example of the unextracted test case generation process according to the present invention. As a result of the above described unextracted test case generation process, the test case "TC-001-1" to be used as base, the condition and the position of the conditional sentence are displayed as information for generating an unextracted test case.

While information for generating an unextracted test case is displayed and the generation of an unextracted test case by the user is supported in the unextracted test case generation process of this embodiment, it may alternatively be so arranged that an unextracted test case is generated automatically on the basis of the test case to be used as base and the condition to register it in the test model.

To date, techniques for identifying an unexecuted test case are known. However, there has been no technique for generating a test case that is recognized neither by the user or nor by the tool such as the above described unextracted test case generation process. Thus, it is now possible to generate an unextracted test case with ease by means of the above described unextracted test case generation process.

Now, the corresponding source code identification process will be described in terms of the operation thereof.

Figure 22:
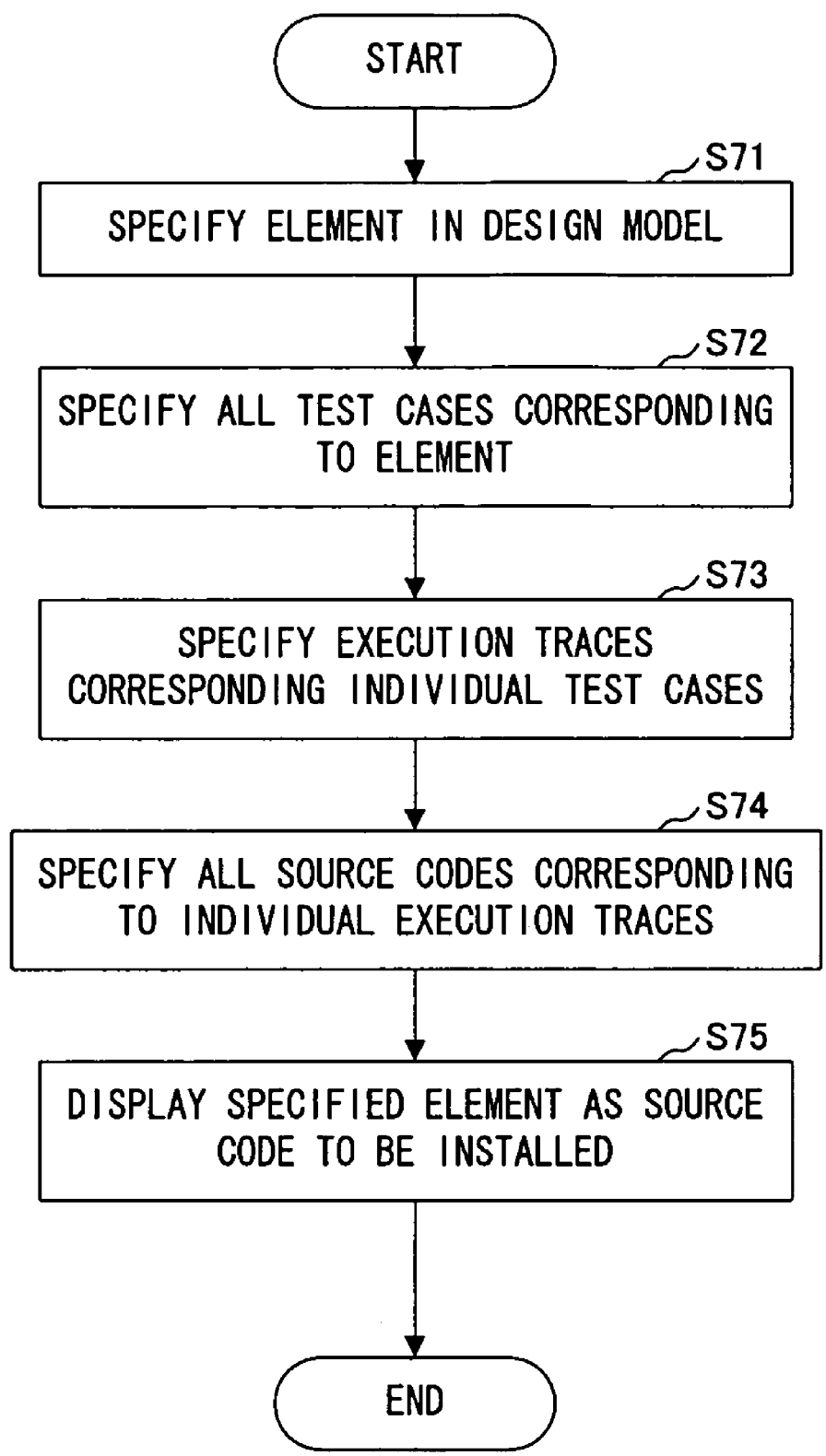
FIG. 22 is a flowchart of an example of operation of the corresponding source code identification process according to the present invention.

FIG. 22 is a flowchart of an example of operation of the corresponding source code identification process according to the present invention. Referring to FIG. 22, firstly the corresponding source code identifying section 35c specifies elements (use cases, sequence chart, etc.) of the design model according to the instruction given by the user (S71). Then, the corresponding source code identifying section 35c specifies all the test cases that correspond to the elements by means of the corresponding relationship information of the design model and acquires them from the test model (S72). Thereafter, the corresponding source code identifying section 35c specifies all the execution traces that correspond to the acquired individual test cases by means of the corresponding relationship information in the test model and acquires them from the execution trace model (S73). Subsequently, the corresponding source code identifying section 35c specifies all the source codes that correspond to the individual execution traces by means of the corresponding relationship information in the execution trace model and acquires them from the source code model (S74). Then, the corresponding source code identifying section 35c displays the source codes it acquires as source codes for installing the specified elements of the design model (S75) to end the flow of operation.

Thus, with the above described corresponding source code identification process, it is possible for the user to find out the source codes for installing elements from the design model with ease to improve the design efficiency and the test efficiency by sequentially tracing the models that are being managed for corresponding relationships in the order of the design model, the test model, the execution trace model and the source code model.

Now, the corresponding design model identification process will be described below in terms of the operation thereof.

Figure 23:
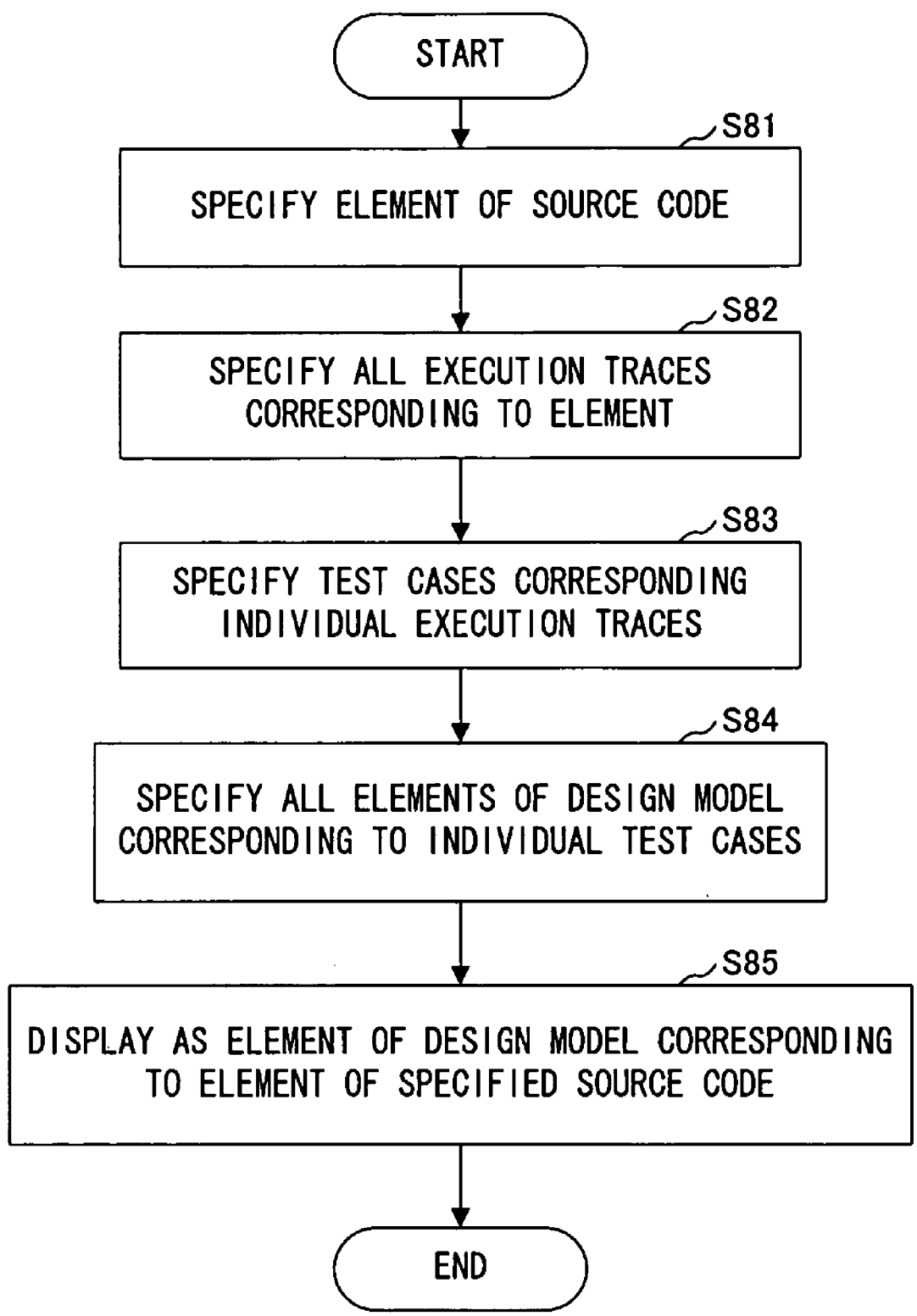
FIG. 23 is a flowchart of an example of operation of the corresponding design model identification process according to the present invention.

FIG. 23 is a flowchart of an example of operation of the corresponding design model identification process according to the present invention. Referring to FIG. 23, firstly the corresponding design model identifying section 35d specifies elements of the source code according to the user instruction (S81). Then, the corresponding design model identifying section 35d identifies all the execution traces of the executed elements by means of the corresponding relationship information of the source code model and acquires them from the execution trace model (S82). Thereafter, the corresponding design model identifying section 35d specifies all the test cases that correspond to the individual execution traces by means of the corresponding relationship information of the execution trace model and acquires them from the test model (S83). Subsequently, the corresponding design model identifying section 35d specifies all the elements (use cases, sequence chart, etc.) of the design model that correspond to the individual test cases by means of the corresponding relationship information of the test model and acquires them from the design model (S84). Then, the corresponding design model identifying section 35d displays the elements of the design model it acquires as elements of the design model that correspond to the elements of the specified source code (S85) to end the flow of operation.

Thus, with the above described corresponding design model identification process, it is possible for the user to find out the elements of the design model that correspond to the elements in the source code model with ease to improve the design efficiency and the test efficiency by sequentially tracing the models that are being managed for corresponding relationships in the order of the source code model, the execution trace model, the test model and the design model.

According to the present invention, there is also provided a program for causing the computer of a software test management apparatus to execute the above-described steps as software test management program. It is possible to cause the computer to execute the above-described program when it is stored in a computer-readable recording medium. Examples of computer-readable recording medium that can be used for the purpose of the present invention include internal storage devices that can be installed in the inside of computers such ROMs and RAMs, portable type storage mediums such as CD-ROMs, flexible disks, DVDs, magneto-optical disks and IC cards, data bases holding programs, other computers and their data bases.

The design model registration step of the program corresponds to the processing step S11 of the above-described embodiment. The source code registration step of the program corresponds to the processing step S12 of the above-described embodiment. The test model registration step of the program corresponds to the processing steps S13, S14 and S15 of the above-described embodiment. The execution trace registration step of the program corresponds to the processing step S16 of the above-described embodiment.

What is claimed is:

1. A computer-readable medium having recorded thereon a software test management program, which when executed by a computer, causes the computer to execute a process comprising:
    registering a design model including use cases;
    registering a source code prepared on a basis of the design model;
    registering test cases prepared to correspond to the use cases in the design model and test data as test model and a corresponding relationship between the design model and the test model;
    registering an execution trace of each test case obtained by executing the source code according to the test cases in the test model, a corresponding relationship between the test model and the execution trace and a corresponding relationship between the execution trace and the source code;
    tracing a corresponding relationship among the design model, the test model, the execution trace and the source code on a basis of the corresponding relationship between the design model and the test model, the corresponding relationship between the test model and the execution trace and the corresponding relationship between the execution trace and the source code; and
    detecting a specified execution trace in which a specified element in the source code is executed, a specified test case corresponding to the specified execution trace and a specified element of the design model corresponding to the specified test case on a basis of the tracing and outputting the specified element of the design model after the tracing.

2. The computer-readable medium according to claim 1, wherein the process further comprises:
    identifying an altered part of altered source code, detecting an execution trace including the altered part, the test case corresponding to the execution trace and the element of the design model corresponding to the test case on the basis of the trace in the tracing and, if the element of the design model includes an alteration, outputting the test case as an amendment-requiring test case after the tracing.

3. The computer-readable medium according to claim 1, wherein the process further comprises:
    detecting an unexecuted part of the source code as an unexecuted block by comparing corresponding positions of all the execution trace and the source code on the basis of the trace in the tracing, detecting a conditional sentence that determines not to execute the unexecuted block of the source code, detecting the execution trace that the conditional sentence is executed and the test case corresponding the execution trace on the basis of the trace in the tracing, determining a condition for the unexecuted block to be executed by analyzing the conditional sentence and outputting the test case and the condition as reference information for a test case to be newly prepared after the tracing.

4. The computer-readable medium according to claim 1, wherein the process further comprises:
    detecting the test case corresponding to the element of the design model, the execution trace corresponding to the test case and the source code corresponding to the execution trace on the basis of the trace in the tracing and outputting the source code after the tracing.

5. The computer-readable medium according to claim 3, wherein
    detecting the unexecuted part further outputs the element of the design model corresponding to the test case as information for preparing a new test case.

6. A software test management apparatus comprising:
    a memory;
    a design model registration section that registers a design model including use cases in the memory;
    a source code registration section that registers a source code prepared on a basis of the design model in the memory;
    a test model registration section that registers, in the memory, test cases prepared to correspond to the use cases in the design model and test data as test model and a corresponding relationship between the design model and the test model;
    an execution trace registration section that registers, in the memory, an execution trace of each test case obtained by executing the source code according to the test cases in the test model, a corresponding relationship between the test model and the execution trace and a corresponding relationship between the execution trace and the source code;
    a model relations management section that traces a corresponding relationship among the design model, the test model, the execution trace and the source code on a basis of the corresponding relationship between the design model and the test model, the corresponding relationship between the test model and the execution trace and the corresponding relationship between the execution trace and the source code; and a corresponding design model identifying section that detects a specified execution trace in which a specified element in the source code is executed, a specified test case corresponding to the specified execution trace and a specified element of the design model corresponding to the specified test case on a basis of the tracing by the model relations management section and outputs the specified element of the design model.

7. The apparatus according to claim 6, further comprising:
an influential test case identifying section that identifies an altered part of altered source code, detects an execution trace including the altered part, the test case corresponding to the execution trace and the element of the design model corresponding to the test case on the basis of the tracing by the model relations management section and, if the element of the design model includes an alteration, outputs the test case as an amendment-requiring test case.

8. The apparatus according to claim 6, further comprising:
an unextracted test case generation section that detects an unexecuted part of the source code as an unexecuted block by comparing corresponding positions of all the execution trace and the source code on the basis of the tracing by the model relations management section, detects a conditional sentence that determines not to execute the unexecuted block of the source code, detects the execution trace that the conditional sentence is executed and the test case corresponding the execution trace on the basis of the tracing by the model relations management section, determines a condition for the unexecuted block to be executed by analyzing the conditional sentence and outputs the test case and the condition as reference information for a test case to be newly prepared.

9. The apparatus according to claim 6, further comprising:
a corresponding source code identifying section that detects the test case corresponding to the element of the design model, the execution trace corresponding to the test case and the source code corresponding to the execution trace on the basis of the tracing by the model relations management section and outputs the source code.

10. The apparatus according to claim 8, wherein
the unextracted test case generation section further outputs the element of the design model corresponding to the test case as information for generating a new test case.

11. A software test management method executed by a software test management apparatus, the method comprising:
registering a design model including use cases in a memory;
registering a source code prepared on a basis of the design model in the memory;
registering, in the memory, test cases prepared to correspond to the use cases in the design model and test data as test model and a corresponding relationship between the design model and the test model;
registering, in the memory, an execution trace of each test case obtained by executing the source code according to the test cases in the test model, a corresponding relationship between the test model and the execution trace and a corresponding relationship between the execution trace and the source code;
tracing a corresponding relationship among the design model, the test model, the execution trace and the source code on a basis of the corresponding relationship between the design model and the test model, the corresponding relationship between the test model and the execution trace and the corresponding relationship between the execution trace and the source code; and
detecting a specified execution trace in which a specified element in the source code is executed, a specified test case corresponding to the specified execution trace and a specified element of the design model corresponding to the specified test case on a basis of the tracing and outputting the specified element of the design model after the tracing.

12. The method according to claim 11, further comprising:
identifying an altered part of altered source code, detecting an execution trace including the altered part, the test case corresponding to the execution trace and the element of the design model corresponding to the test case on the basis of the trace in the tracing and, if the element of the design model includes an alteration, outputting the test case as an amendment-requiring test case after the tracing.

13. The method according to claim 11, further comprising:
detecting an unexecuted part of the source code as an unexecuted block by comparing corresponding positions of all the execution trace and the source code on the basis of the trace in the tracing, detecting a conditional sentence that determines not to execute the unexecuted block of the source code, detecting the execution trace that the conditional sentence is executed and the test case corresponding the execution trace on the basis of the trace in the tracing, determining a condition for the unexecuted block to be executed by analyzing the conditional sentence and outputting the test case and the condition as reference information for a test case to be newly prepared after the tracing.

14. The method according to claim 11, further comprising:
detecting the test case corresponding to the element of the design model, the execution trace corresponding to the test case and the source code corresponding to the execution trace on the basis of the trace in the tracing and outputting the source code after the tracing.

15. The method according to claim 13, wherein
the detecting the unexecuted part further outputs the element of the design model corresponding to the test case as information for generating a new test case.

* * * * *